Dec. 30, 1924.

S. W. NICHOLSON 1,521,040

WINDOW CONTROL MECHANISM

Filed Sept. 11, 1922. 2 Sheets-Sheet 1

Inventor

Stanley W. Nicholson

By Whittemore, Hulbert, Whittemore, & Belknap

Attorneys

Dec. 30, 1924.
S. W. NICHOLSON
1,521,040
WINDOW CONTROL MECHANISM
Filed Sept. 11, 1922
2 Sheets-Sheet 2
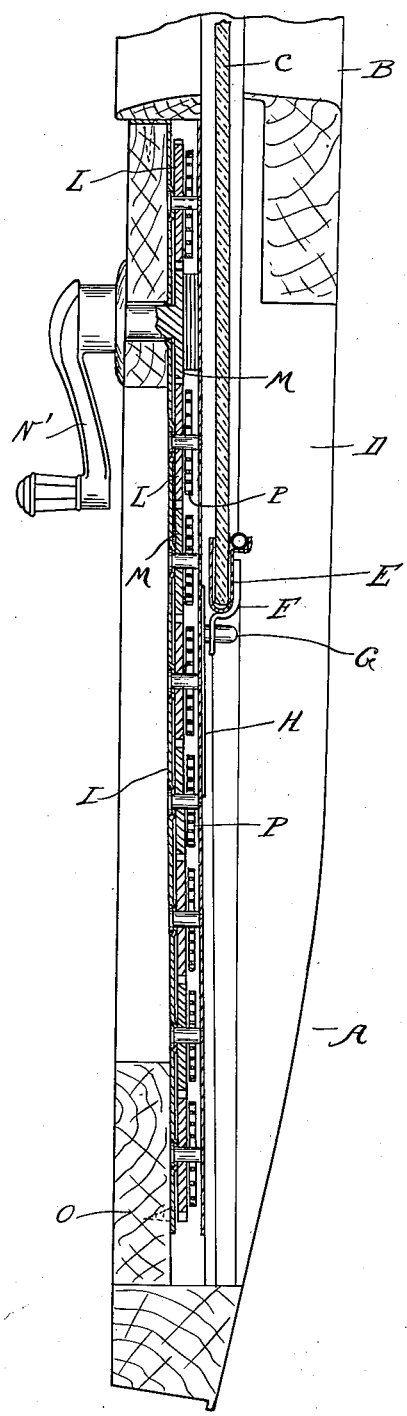
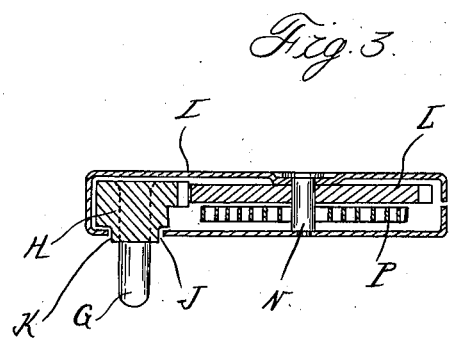
Inventor
Stanley W. Nicholson
By Whittemore, Hulbert, Whittemore, & Belknap
Attorneys

Patented Dec. 30, 1924.

1,521,040

UNITED STATES PATENT OFFICE.

STANLEY W. NICHOLSON, OF TOLEDO, OHIO, ASSIGNOR TO THE DURA COMPANY, OF TOLEDO, OHIO, A CORPORATION OF DELAWARE.

WINDOW-CONTROL MECHANISM.

Application filed September 11, 1922. Serial No. 587,598.

*To all whom it may concern:*

Be it known that I, STANLEY W. NICHOLSON, a citizen of the United States of America, residing at Toledo, in the county of Lucas and State of Ohio, have invented certain new and useful Improvements in Window-Control Mechanism, of which the following is a specification, reference being had therein to the accompanying drawings.

This invention relates to window control mechanisms and relates particularly to mechanisms for controlling the sliding windows of vehicles.

The invention consists in the structural features and arrangement of parts hereinafter fully described.

In the drawings:—

Figure 2 is a longitudinal sectional view of said door taken on line 2—2 of Figure 1;

Figure 3 is a cross section view thereof on line 3—3 of Figure 1.

Figure 1:
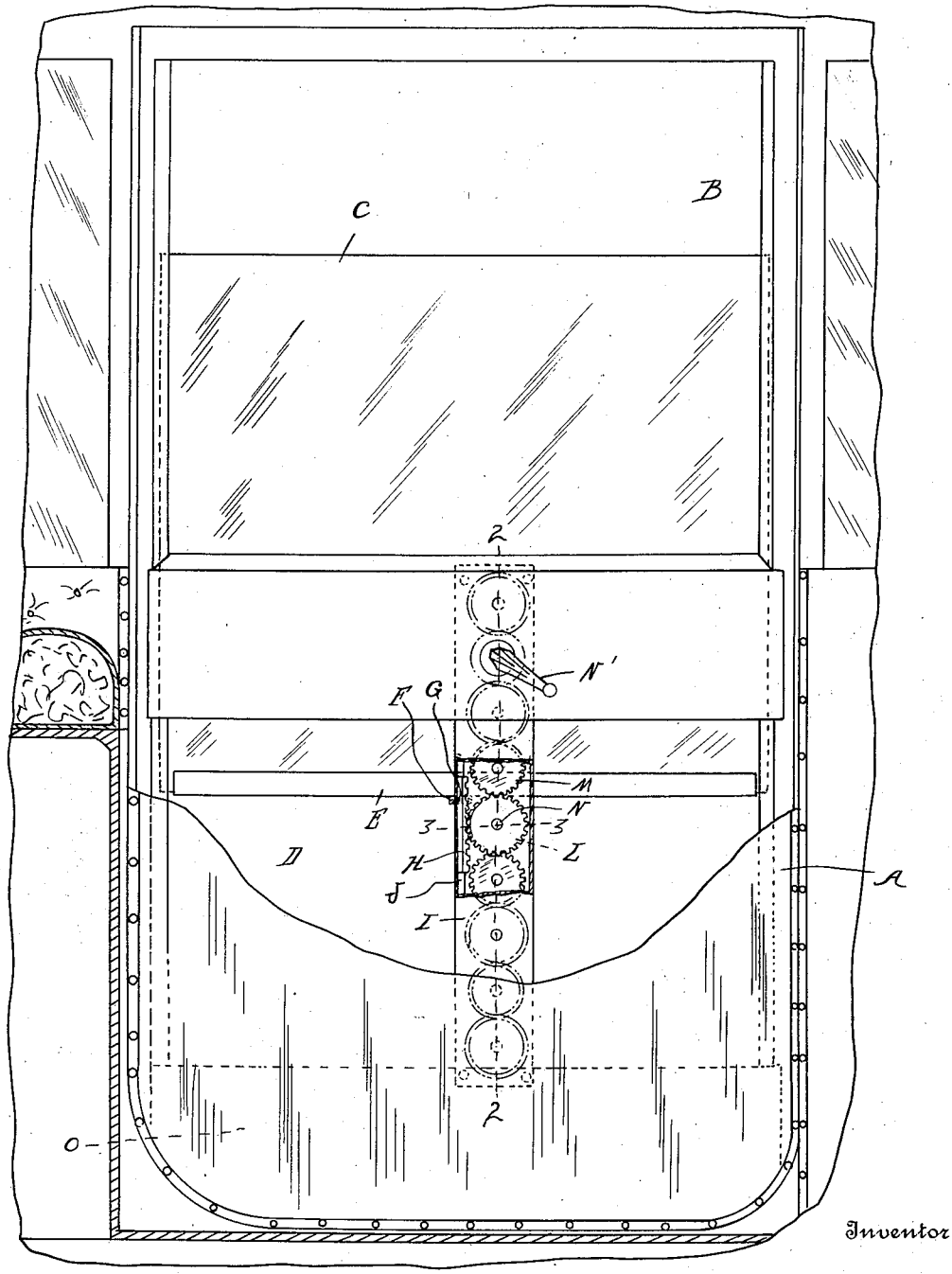
Figure 1 is an interior view of an automobile door equipped with the improved mechanism.

In these views the reference character A designates an automobile door having in its upper portion the usual opening B provided with the usual closure having the nature of a sliding glass plate C. The latter as, it is lowered to open position, is adapted to enter a chamber D formed in the lower portion of the door, as is common practice. The usual sheet metal channel strip E embraces the lower edge of the plate C and at substantially its mid-point a depending plate F carried by said strip is loosely engaged by a pin G rigidly carried by a vertical rack bar H. Said bar is adapted to be actuated vertically within a tubular sheet metal casing I formed preferably in channel shaped halves, as is best seen in Figure 3, said casing being vertically slotted, as indicated at J, to accommodate a boss K on the rack bar surrounding the pin G. Within said casing there is furthermore arranged a train of gears L, M mounted in a vertical row, said gears being carried by stub shafts N which are journalled in the side walls of the casing I. The gears L are adapted to mesh with the rack H for actuating the latter vertically while the intermediate gears M are set back slightly from the rack H so as to turn independently of said rack. Thus all of the gears L which are designed to engage the rack bar rotate in a common direction. For driving said train of gears a suitable crank handle N' is mounted upon the shaft N of the uppermost gear M. The rack bar H is so proportioned in length that it will pass into mesh successively with the gears L as it is actuated upwardly or downwardly, engaging each gear just prior to disengaging the next adjacent gear M of the series. Thus while the rack bar H is comparatively short, it nevertheless transmits a continuous upward or downward effort to the closure C in all its positions of travel. The necessity for employing a short rack bar in a mechanism of the described character lies in the fact that the sliding travel of the closure must be limited through engagement of said rack bar with the bottom bar O of the door and a long rack bar would not permit a sufficient travel of the closure to fully uncover the opening B. To counterbalance the glass plate C so that the effort necessary for lifting will be substantially the same as is required for lowering said plate, it is preferred to mount a spiral spring P upon each stub shaft N, each of said springs being relatively weak but exerting accumulative effort through the gear or gears L having engagement with the rack bar H sufficient to fully counter-balance the weight of said plate.

The described mechanism presents the advantage of a unitary assembly that may be completely assembled within the tubular casing I before installation of the device upon a vehicle. Also the mechanism is very compact and because of its slight thickness is particularly adapted to fit into the restricted space afforded within the openings of vehicle doors or hollow vehicle frames. The construction is one that avoids lost motion and consequent rattle.

What I claim as my invention is:—

1. In a window control mechanism the combination with a sliding closure, of a rack bar carried thereby and extending in the direction of travel thereof, and a train of gears having the plane of their axes substantially parallel to said rack bar, said train comprising idling gears alternating with actuating gears, the actuating gears of said train being adapted to inter-mesh with said rack bar, the latter being proportioned in length to pass into engagement successively with each of said actuating gears just prior to disengaging from the preceding actuating gear of the series, and means for driving said train of gears.

2. In a window control mechanism the combination with a sliding closure, of a rack bar carried thereby and extending in the direction of travel thereof, a plurality of gears successively acting upon said rack bar in progressive stages of its travel to effect such travel, actuating means for such gears, and coiled spring accumulatively acting upon the rack bar through the respective gears to counterbalance said closure.

3. In a window control mechanism the combination with a sliding closure, of a rack bar carried thereby and extending in the direction of travel thereof, a plurality of gears successively engaging said rack bar in progressive stages of its travel to actuate such travel, intermediate idler gears forming a train with the first mentioned gears, an elongated casing inclosing said gears and rack bar, and actuating means for said gear train.

4. In a window control mechanism the combination with a sliding closure, of a rack bar carried thereby and extending in the direction of travel thereof, a plurality of gears successively acting upon said rack bar in progressive stages of its travel to effect such travel, actuating means for such gears, and coiled springs accumulatively acting upon the rack bar through the respective gears to counterbalance said closure, and means establishing a unitary mounting for said gears, springs and actuating means.

5. In a window control mechanism, the combination with a sliding closure, of a rack element carried thereby and extending in the direction of travel thereof, and a train of gears extending in the same direction, alternate gears of said train being successively engageable with the rack element to actuate the same in progressive positions of the closure, and the intermediate gears being set back from the path of the rack to clear the same.

6. In a window control mechanism, the combination with a sliding closure, of a rack element attached to said closure and extended in the direction of travel of the closure, and a train of gears having their axes substantially in a plane parallel to the direction of travel of the closure, alternate gears of said train being successively engageable with said rack to actuate the closure through the latter, the intermediate gears being of a lesser diameter to clear the rack element.

7. In a window control mechanism, the combination with a sliding closure, of a row of rotative actuating members for said closure extending substantially in the direction of travel of the closure and having their axes substantially transverse to said direction, and a complementary actuating member for the closure carried by the latter and elongated in the direction of travel thereof and engageable through such travel successively with certain of the rotative actuating members.

8. In a window control mechanism, the combination with a sliding closure, of a row of rotative actuating members for said closure extending substantially in the direction of travel of the closure and having their axes substantially transverse to said direction, each of said members reversely driving the adjacent member, and a complementary actuating member for the closure carried by the latter and elongated in the direction of travel thereof and engageable through such travel with alternate rotative members of said row.

9. In a window control mechanism, the combination with a sliding closure, of an actuating member therefor carried thereby and elongated in the direction of travel thereof, and a row of complementary rotative actuating members extending in the direction of travel of the closure and having their axes substantially transverse to said direction, the member upon the closure being tangentially engageable successively with certain of said rotative members through travel of the closure.

In testimony whereof I affix my signature.

STANLEY W. NICHOLSON.